(12) United States Patent
Lee et al.

(10) Patent No.: US 10,367,240 B2
(45) Date of Patent: Jul. 30, 2019

(54) BATTERY MODULE

(71) Applicant: LG CHEM, LTD., Seoul (KR)

(72) Inventors: Jong-Young Lee, Daejeon (KR);
Jun-Yeob Seong, Daejeon (KR);
Gang-U Lee, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/542,979

(22) PCT Filed: Mar. 21, 2016

(86) PCT No.: PCT/KR2016/002813
§ 371 (c)(1),
(2) Date: Jul. 12, 2017

(87) PCT Pub. No.: WO2016/159549
PCT Pub. Date: Oct. 6, 2016

(65) Prior Publication Data
US 2018/0019508 A1    Jan. 18, 2018

(30) Foreign Application Priority Data
Mar. 27, 2015  (KR) .................. 10-2015-0043545

(51) Int. Cl.
*H01M 10/6555* (2014.01)
*H01M 2/10* (2006.01)
(Continued)

(52) U.S. Cl.
CPC ......... *H01M 10/6555* (2015.04); *H01M 2/10* (2013.01); *H01M 10/625* (2015.04); *H01M 10/653* (2015.04); *H01M 10/6551* (2015.04)

(58) Field of Classification Search
CPC .... H01M 2/10; H01M 10/625; H01M 10/653; H01M 10/6551; H01M 10/6555
See application file for complete search history.

(56) References Cited

U.S. PATENT DOCUMENTS

2012/0298433 A1* 11/2012 Ohkura ............... H01M 2/1077
180/65.1
2013/0004822 A1    1/2013 Hashimoto et al.
(Continued)

FOREIGN PATENT DOCUMENTS

CN      101651226 A     2/2010
DE  10 2011 007 069 A1   10/2012
(Continued)

OTHER PUBLICATIONS

International Search Report (PCT/ISA/210) issued in PCT/KR2016/002813, dated Sep. 5, 2016.

*Primary Examiner* — Edu E. Enin-Okut
(74) *Attorney, Agent, or Firm* — Birch, Stewart, Kolasch & Birch, LLP

(57) ABSTRACT

Disclosed is a battery module which ensures efficient cooling performance and advantageously has a structurally firm and small design, and a battery pack and a vehicle including the battery module. The battery module includes a plurality of pouch-type secondary batteries standing in a vertical direction and arranged in a right and left direction; a plurality of cartridges configured to accommodate the pouch-type secondary batteries in an inner space thereof and stacked in a right and left direction; and a cooling plate made of a thermally-conductive material and disposed at a lower portion of the cartridges so that the cartridges are placed thereon, the cooling plate having an upper surface which is at least partially adhered and fixed to the cartridges by means of an adhesive.

15 Claims, 4 Drawing Sheets

(51) Int. Cl.
*H01M 10/625* (2014.01)
*H01M 10/653* (2014.01)
*H01M 10/6551* (2014.01)

(56) References Cited

U.S. PATENT DOCUMENTS

| | | | |
|---|---|---|---|
| 2013/0295422 A1 | 11/2013 | Kim et al. | |
| 2014/0234691 A1* | 8/2014 | Lee | H01M 10/625 429/120 |
| 2015/0349394 A1* | 12/2015 | Hayashida | H01M 10/6551 429/120 |

FOREIGN PATENT DOCUMENTS

| | | |
|---|---|---|
| JP | 2012-227120 A | 11/2012 |
| KR | 10-2012-0086657 A | 8/2012 |
| KR | 10-2013-0004141 A | 1/2013 |
| KR | 10-2013-0086678 A | 8/2013 |
| KR | 10-2014-0144784 A | 12/2014 |
| KR | 10-2014-0147555 A | 12/2014 |
| WO | WO-2013111959 A1 * 8/2013 ........ H01M 10/5016 |

* cited by examiner

BATTERY MODULE

TECHNICAL FIELD

The present application claims priority to Korean Patent Application No. 10-2015-0043545 filed on Mar. 27, 2015 in the Republic of Korea, the disclosures of which are incorporated herein by reference.

The present disclosure relates to a battery including at least one secondary battery, and more particularly, to a battery module which has a simple structure, small volume and weight, and efficient cooling performance, and a battery pack and a vehicle including the battery module.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. When being used for middle-sized or large-sized devices, a great number of secondary batteries are electrically connected to enhance capacity and output. In particular, in middle-sized or large-sized devices, pouch-type secondary batteries are frequently used since they can be easily stacked and have light weight.

If a secondary battery is heated over a proper temperature, the performance of the secondary battery may deteriorate, and in severe cases, the secondary battery may be exploded or fired. In particular, when a plurality of pouch-type secondary batteries are stacked to configure a battery module, the heat emitted from the plurality of secondary batteries in a narrow space is accumulated, which may raise the temperature of the battery module rapidly and severely. Further, if the battery module is included in a battery pack for a vehicle, the battery module may be frequently exposed to direct sunlight and may also be placed in a high-temperature condition, for example in summer or in a desert.

Therefore, when a battery module is configured using a plurality of secondary batteries, it is very important to ensure stable and effective cooling performance. However, since the battery module is consistently demanded to have a small design, ensure rigidity and enhance capacity, it is substantially required to develop a battery module which may enhance cooling performance while satisfying various demands as above.

DISCLOSURE

Technical Problem

The present disclosure is designed to solve the problems of the related art, and therefore the present disclosure is directed to providing a battery module, which may ensure efficient cooling performance and advantageously have a structurally firm and small design, and a battery pack and a vehicle including the battery module.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a module, comprising: a plurality of pouch-type secondary batteries standing in a vertical direction and arranged in a right and left direction; a plurality of cartridges configured to accommodate the pouch-type secondary batteries in an inner space thereof and stacked in a right and left direction; and a cooling plate made of a thermally-conductive material and disposed at a lower portion of the cartridges so that the cartridges are placed thereon, the cooling plate having an upper surface which is at least partially adhered and fixed to the cartridges by means of an adhesive.

Here, the cooling plate may have a convex portion formed at an upper surface thereof in an upper direction, and the cartridge may have a concave portion formed at a lower portion thereof in an upper direction with a shape corresponding to the convex portion.

In addition, a lower portion of the convex portion of the cooling plate may be formed concavely.

In addition, the convex portion of the cooling plate may have an inclined surface at least partially with a width gradually decreasing along an upper direction.

In addition, the battery module may further include a cooling fin made of a plate-shaped thermally-conductive material and disposed to contact a surface of at least one secondary battery in a state of standing in a vertical direction, the cooling fin having a lower end configured to contact the cooling plate.

In addition, the cooling fin may be disposed to at least one of an outermost side of the secondary battery and a location between the secondary batteries.

In addition, both surfaces of a lower end of the cooling fin may respectively make surface contact with the cartridge and the cooling plate.

In addition, the adhesive may be interposed between lower ends of two adjacent cooling fins, between a lower portion of the cartridge and an upper portion of the cooling plate.

In addition, the lower end of the cooling fin may be at least partially inclined in one direction.

In addition, a left end and a right end of the cooling plate may be bent in an upper direction.

In addition, a lower portion of the secondary battery may be placed on an upper portion of a lower unit frame of the cartridge.

In addition, at least the lower unit frame of the cartridge may include a thermally-conductive polymer or be made of a thermally-conductive material containing a thermally-conductive filler and polymer.

In addition, the pouch-type secondary battery may be at least partially adhered and fixed to the cartridge by means of an adhesive.

In addition, the adhesive may be a thermally-conductive adhesive.

In another aspect of the present disclosure, there is also provided a battery pack, which includes the battery module according to the present disclosure.

In another aspect of the present disclosure, there is also provided a vehicle, which includes the battery module for a secondary battery according to the present disclosure.

Advantageous Effects

In an embodiment of the present disclosure, a battery module including a plurality of pouch-type secondary batteries may have improved cooling performance.

In particular, in an embodiment of the present disclosure, an adhesive may be interposed between a cartridge and a cooling plate to remove or minimize an air layer between them. Therefore, thermal conduction between the cartridge and the cooling plate may be improved, which may enhance cooling performance of the battery module.

In addition, in an embodiment of the present disclosure, a cooling fin may be configured to make surface contact with the secondary battery, and, at this time, a lower portion of the cooling fin may contact the cooling plate with an adhesive being interposed in the contact portion, which may remove an air layer and thus improve heat emission performance through the cooling fin.

Further, in an embodiment of the present disclosure, cooling performance may be ensured over a certain level regardless of roughness of contact surfaces among the cartridge, the cooling fin and the cooling plate.

In addition, in an embodiment of the present disclosure, the battery module may have a simple structure and a reduced weight. Therefore, in this embodiment of the present disclosure, the battery module may be easily fabricated and repaired, with reduced costs.

In addition, in an embodiment of the present disclosure, by reducing a volume of the battery module, the battery module may easily have a small design and its capacity and output may be enhanced with the same size.

In addition, in an embodiment of the present disclosure, a secondary battery may be directly adhered and fixed to the cartridge. Therefore, in this embodiment of the present disclosure, a heat transfer distance between the cartridge and the secondary battery is short, and an air layer between the secondary battery and the cartridge may be reduced or eliminated, thereby improving cooling performance and also preventing the secondary battery from moving in the cartridge.

In addition, in an embodiment of the present disclosure, the cartridge may be made of a thermally-conductive material such as a thermally-conductive plastic or a thermally-conductive rubber. In this case, the heat of the secondary battery may also be transferred through the cartridge to the cooling plate or the like, and thus the cooling performance of the battery module may be improved.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
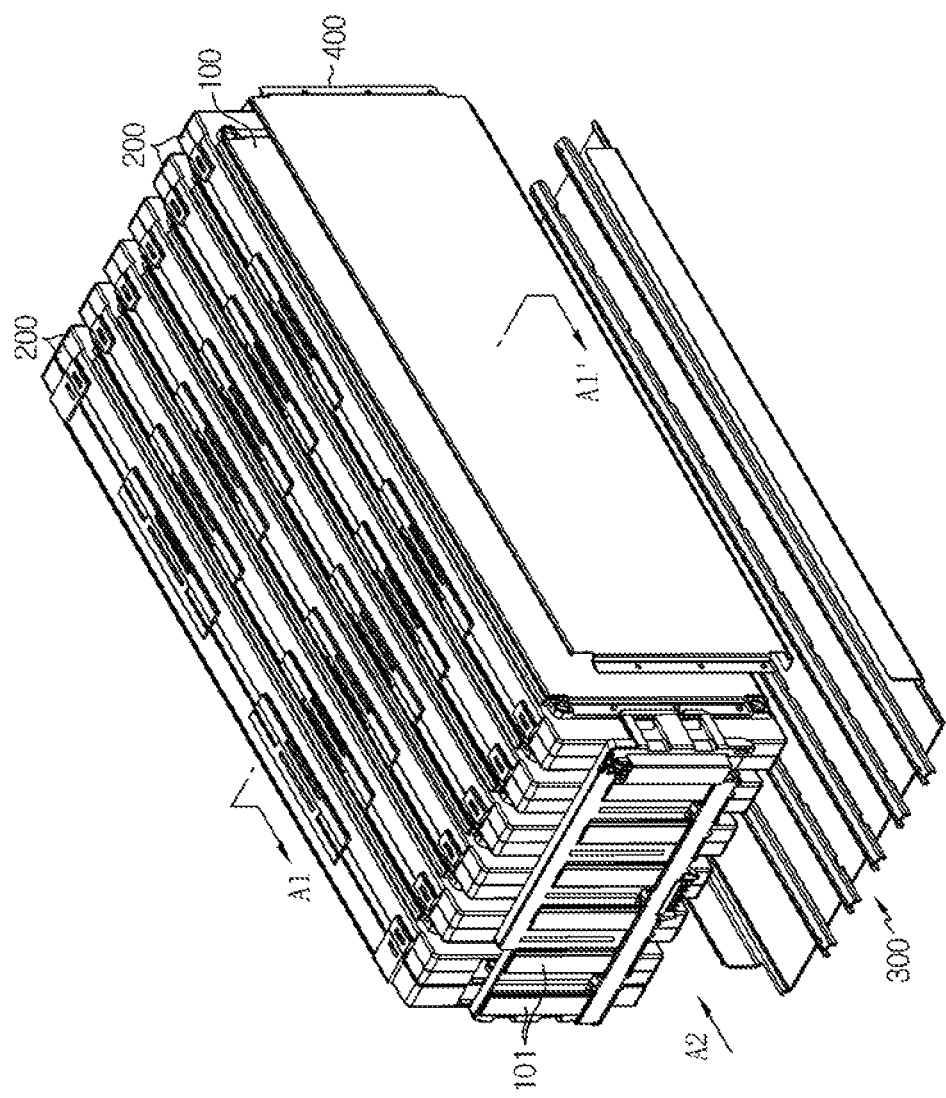
FIG. 1 is a perspective view schematically showing a battery module according to an embodiment of the present disclosure.
Figure 2:
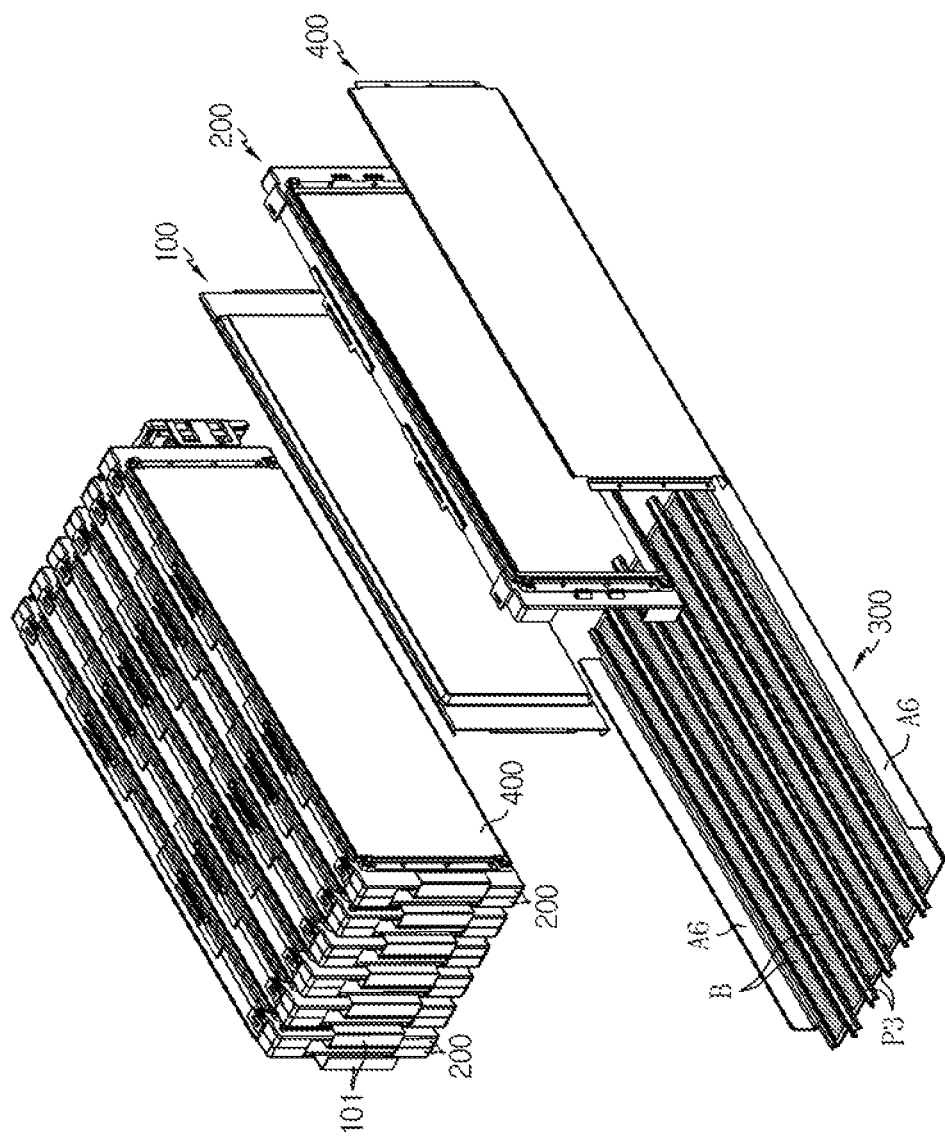
FIG. 2 is a perspective view showing a partial configuration of FIG. 1, separately.
Figure 3:
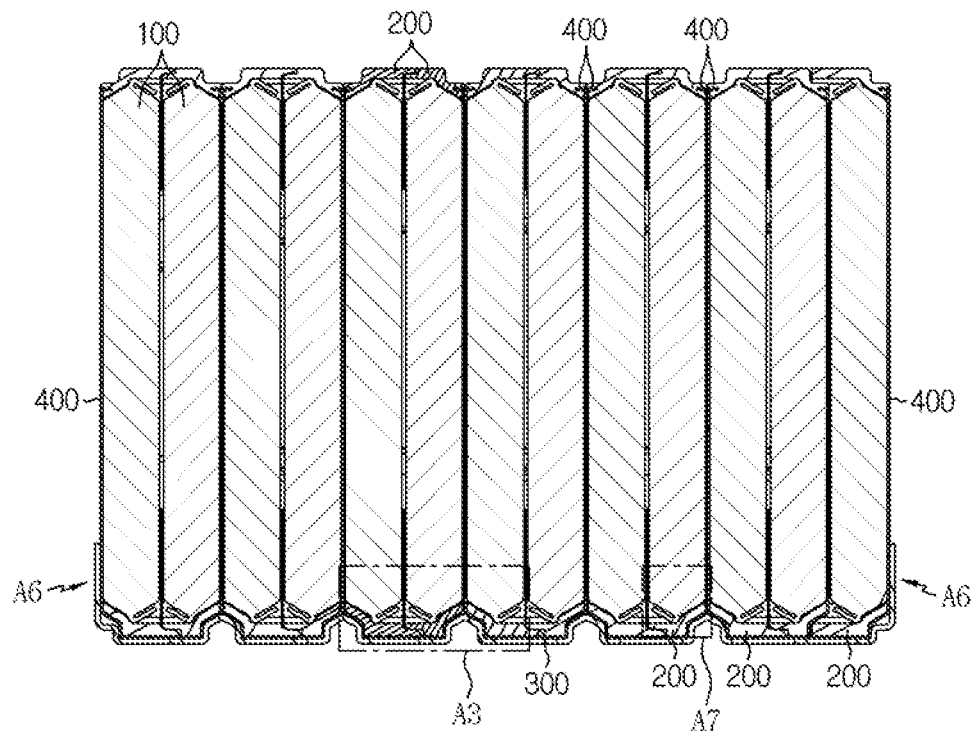
FIG. 3 is a cross-sectional view, taken along the line A-A' of FIG. 1, in a state where components of FIG. 1 are assembled.

FIG. 1 is a perspective view schematically showing a battery module according to an embodiment of the present disclosure. Also, FIG. 2 is a perspective view showing a partial configuration of FIG. 1, separately. In addition, FIG. 3 is a cross-sectional view, taken along the line A-A' of FIG. 1, in a state where components of FIG. 1 are assembled. Referring to FIGS. 1 to 3, a battery module according to the present disclosure may include a secondary battery 100, a cartridge 200 and a cooling plate 300.

A plurality of secondary batteries 100 may be provided in a single battery module. In particular, each of the plurality of secondary batteries 100 may be a pouch-type secondary battery. The pouch-type secondary battery 100 may include an electrode assembly, an electrolyte and a pouch exterior.

Here, the electrode assembly may be configured so that at least one positive electrode plate and at least one negative electrode plate are arranged with a separator being interposed therebetween. In more detail, the electrode assembly may be classified into a winding-type electrode assembly in which a single positive electrode plate and a negative electrode plate are wound together with a separator, and a stacking-type electrode assembly in which a plurality of positive electrode plates and a plurality of negative electrode plates are alternately stacked with a separator being interposed therebetween.

In addition, the pouch exterior may be configured to have an outer insulation layer, a metal layer and an inner adhesive layer. The pouch exterior may be configured to include a metal foil, for example an aluminum foil, to protect inner components such as an electrode assembly and an electrolyte and also to supplement electrochemical properties by the electrode assembly and the electrolyte and enhance heat radiation. In addition, the aluminum foil may be interposed between insulation layers made of an insulating material in order to ensure electric insulation from inner components of the secondary battery 100 such as an electrode assembly and an electrolyte and other components out of the secondary battery 100.

In particular, the pouch exterior may be composed of two pouches, and at least one of them may have an inner space with a concave shape. In addition, the electrode assembly may be accommodated in the inner space of the pouch. Moreover, sealing portions are provided at outer circumferences of two pouches, and these sealing portions are fused to each other so that the inner space accommodating the electrode assembly is sealed.

Meanwhile, an electrode tab is provided at each electrode plate of the electrode assembly, and at least one electrode tab may be connected to an electrode lead 101. In addition, the electrode lead 101 may be interposed between sealing portions of two pouches and exposed out of the pouch exterior, to serve as an electrode terminal of the secondary battery 100.

The battery module according to an embodiment of the present disclosure may include pouch-type secondary batteries of various shapes, known in the art at the filing date of this application.

The pouch-type secondary batteries 100 may be arranged in a horizontal direction in a state of standing in a vertical direction. For example, in the configuration depicted in FIGS. 1 and 2, assuming that a side where the electrode lead 101 is observed as a whole is defined as a front side of the battery module, if the battery module is observed from the front side of the battery module, a plurality of pouch-type secondary batteries 100 may be arranged in a right and left direction in a state of standing vertically on the ground so that their broad surfaces are toward right and left sides.

In other words, in the battery module according to the present disclosure, the pouch-type secondary batteries 100 may be configured so that two broad surfaces thereof are toward right and left sides, and the pouch-type secondary batteries may stand so that sealing portions are located at upper, lower, front and rear sides thereof. In addition, the pouch-type secondary batteries 100 may be arranged in parallel in a right and left direction so that their broad surfaces, namely outer surfaces of accommodation spaces which accommodate electrode assemblies, face each other.

Meanwhile, in the present disclosure, upper, lower, front, rear, right and left directions are defined so that a portion where the electrode lead 101 protrudes and is thus exposed in the figure is a front side, and directions are determined based on a state where the battery module is observed from the front side, unless otherwise stated. In other words, upper, lower, front, rear, right and left directions are defined based on a state where the battery module is observed in a direction indicated by an arrow A2 in FIG. 1.

The cartridge 200 may accommodate the pouch-type secondary batteries 100 in an inner space thereof, protects an outer side of the pouch-type secondary batteries 100, particularly an outer side of a rim portion thereof where a sealing portion is located, guides the pouch-type secondary batteries 100 to be arranged, and prevents the stacked assembly from moving.

In addition, the cartridge 200 may be configured to be stacked with another cartridge. For example, as shown in FIGS. 1 to 3, the cartridges 200 may be stacked in the same direction as the stacking direction of the secondary batteries 100, namely in a right and left direction.

Here, the cartridges 200 may have uneven structures at their stacking surfaces, namely right or left surfaces thereof, with corresponding shapes. In this embodiment of the present disclosure, the uneven structures formed at the cartridges 200 may improve a coupling force and a fixing force between the cartridges 200, and the uneven structures may play a role of guide to facilitate easier assembling.

In particular, the cartridge 200 may be formed with a tetragonal ring shape, as shown in FIG. 2. In this case, the cartridge 200 may be configured with four unit frames whose both ends are connected to each other. Since the pouch-type secondary battery 100 generally has a tetragonal shape, the cartridge 200 may have a tetragonal ring shape to surround the outer circumference of the pouch-type secondary battery 100 from an outer side. At this time, the unit frames of the cartridge 200 may be separately fabricated and then assembled to each other or may be integrally formed from the first.

In this configuration, the cartridge 200 may be formed to have a hollow center, and the pouch-type secondary battery 100 may be accommodated in an inner space formed by the hollow center. In other words, the pouch-type secondary battery 100 may be located in the inner space defined by the unit frames of the cartridge 200, and when the cartridges 200 are stacked, the pouch-type secondary battery 100 may be located in an inner space formed by the stacked cartridges so that at least a part of its outer side is covered.

The battery module according to the present disclosure may include a plurality of cartridges 200, and the number of cartridges 200 may be variously changed.

The cartridge 200 may be coupled to another cartridge 200 adjacent thereto, and at least one secondary battery 100 may be accommodated in a space defined by the coupled cartridges. In particular, two cartridges 200 adjacent to each other may be coupled to each other to make a pair, and two secondary batteries 100 may be included in the inner space formed by the coupled cartridges 200. At this time, a coupling structure may be provided between the cartridges 200 which make a pair. For example, as shown in FIGS. 1 and 2, hooking structures shaped to correspond to each other may be formed at upper portions of two cartridges 200 coupled to each other. For example, when a left cartridge 200 and a right cartridge 200 are coupled, a protrusion such as a hook may be formed at the right cartridge 200, and a groove may be formed at the left cartridge 200 so that the protrusion may be inserted therein. In addition, as shown in FIG. 3, uneven portions shaped to correspond to each other may be formed at two cartridges 200 coupled to each other. For example, a protrusion protruding in a right direction may be formed at the left cartridge 200, and a groove may be formed at the right cartridge 200 so that the protrusion may be inserted therein.

Meanwhile, an odd number of cartridges 200 may be included in the battery module. In this case, at least one cartridge 200 may be configured to accommodate only one secondary battery 100.

For example, referring to the configuration depicted in FIG. 3, the battery module may include thirteen cartridges 200 and thirteen secondary batteries 100 in total. In this case, any cartridge 200 may be configured to accommodate a single secondary battery 100 between the cartridge 200 and another cartridge 200 adjacent thereto, like a cartridge 200 located at a rightmost side.

The cartridge 200 may be configured to accommodate a single secondary battery 100 in the inner space. Namely, each cartridge may be configured to surround a rim portion of a single secondary battery. At this time, one side of the cartridge may be configured to have a smaller size than the secondary battery, and the other side may be configured to have a size equal to or greater than the secondary battery. For example, a right side of the cartridge may be configured to have a smaller size than the secondary battery, so that a secondary battery accommodated in the inner space of the cartridge does not deviate in a right direction of the cartridge. In addition, a left side of the cartridge may be configured to have a greater size than the secondary battery, so that a secondary battery may be accommodated in the inner space at a right side of the cartridge. In this case, at a right side of the cartridge, another cartridge having a left side broader than the secondary battery may be coupled to prevent the secondary battery from being deviated.

At least a part of the cooling plate 300 may be made of a thermally-conductive material. For example, the cooling plate 300 may be made of metal such as aluminum, copper and steel, or metal alloy. Therefore, the cooling plate 300 may ensure better heat transfer between the secondary battery 100, or the cartridge 200, and the outside of the battery module. In particular, the cooling plate 300 may allow the heat generated at the secondary battery 100 to be more easily discharged out of the battery module.

The cooling plate 300 may be configured with an approximately plate shape and be disposed at a lower portion of the cartridge 200. Here, the cooling plate 300 may be disposed to be laid in parallel to the ground, and the plurality of cartridges 200 may be placed on the cooling plate 300 in a state of standing substantially perpendicular to an angle of the surface of the cooling plate 300. In other words, each cartridge 200 may be disposed so that its lower portion is placed on an upper portion of the cooling plate 300.

In particular, in the battery module according to the present disclosure, the upper surface of the cooling plate 300 may be at least partially adhered and fixed to the cartridge 200 by means of an adhesive.

For example, as indicated by B in FIG. 2, an adhesive may be coated to at least a part of the upper surface of the cooling plate 300, and as the lower end of the cartridge 200 is contacted to the portion coated with the adhesive, the cartridge 200 and the cooling plate 300 may be adhered and fixed to each other. In other words, if the cartridge 200 is composed of four unit frames including an upper unit frame, a lower unit frame, a front unit frame and a rear unit frame, at least the lower unit frame may be adhered and fixed to the upper surface of the cooling plate 300.

In this embodiment of the present disclosure, since the cartridge 200 and the cooling plate 300 are fixed to each other by means of the adhesive, the coupling force between the cartridge 200 and the cooling plate 300 may be further enhanced. In this configuration, a coupling configuration between the cartridge 200 and the cooling plate 300 may be eliminated or reduced, which may simplify the structure of the battery module, simplify the fabrication process and reduce the volume of the battery module.

In addition, in this configuration of the present disclosure, since a distance between the cartridge 200 and the cooling plate 300 may be minimized, a distance between the cartridge 200 and the secondary battery 100 decreases, and thus heat transfer efficiency from the secondary battery 100 to the cooling plate 300 may be further improved.

Moreover, in this configuration of the present disclosure, since an air layer between the cartridge 200 and the cooling plate 300 may be eliminated or reduced, heat resistance caused by the air layer may be reduced, and thus the heat of the secondary battery 100 may be effectively transferred to the cooling plate 300. In particular, in this case, even though the lower surface of the cartridge 200 and the upper surface of the cooling plate 300 are configured somewhat roughly, effective heat transfer performance from the cartridge 200 to the cooling plate 300 may be ensured, regardless of the roughness of the surfaces.

In addition, in this configuration of the present disclosure, before the cartridge 200 and the secondary battery 100 are placed on the upper portion of the cooling plate 300, an adhesive is coated to the upper surface of the cooling plate 300, and any separate space or structure for coating the adhesive may not be needed.

Here, the adhesive interposed between the cartridge 200 and the cooling plate 300 may be a thermally-conductive adhesive. Since the thermally-conductive adhesive has higher thermal conductivity in comparison to general adhesives, the thermally-conductive adhesive may further enhance heat transfer capacity and heat transfer rate between the cartridge 200 and the cooling plate 300. Therefore, in this embodiment of the present disclosure, the heat of the secondary battery 100 may be discharged more efficiently through the cooling plate 300, which may improve cooling performance of the battery module.

Preferably, the cooling plate 300 and the cartridge 200 may respectively have a convex portion and a concave portion, shaped to correspond to each other. This will be described in more detail with reference to FIG. 4.

Figure 4:
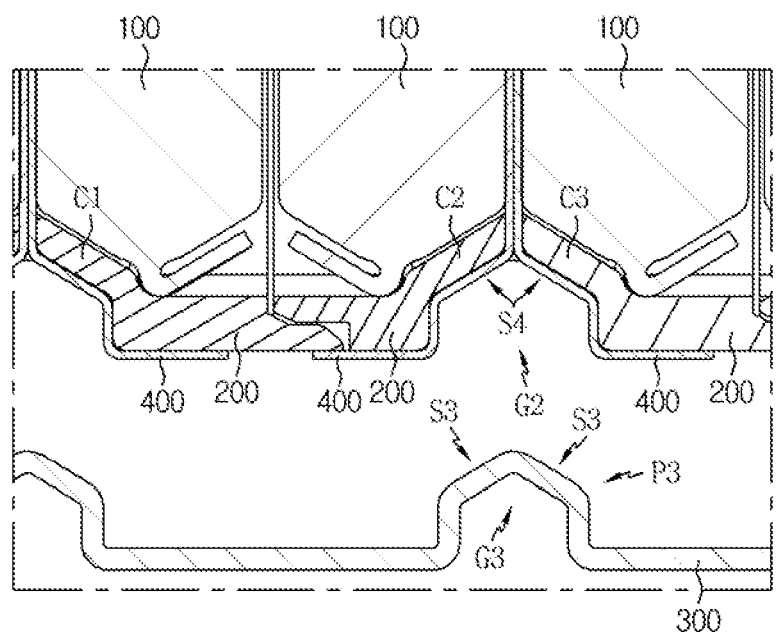
FIG. 4 is a diagram showing a portion A3 of FIG. 3 in an enlarged state.

FIG. 4 is a diagram showing a portion A3 of FIG. 3 in an enlarged state.

Referring to FIG. 4, the cooling plate 300 may have a convex portion formed at the upper surface thereof to protrude in an upper direction, as indicated by P3. In addition, the cartridge 200 may have a concave portion formed at the lower portion thereof with a shape corresponding to the convex portion of the cooling plate 300 to be concave in an upper direction, as indicated by G2.

In this configuration, if the cartridge 200 is placed on the upper portion of the cooling plate 300, the convex portion P3 of the cooling plate 300 may be inserted into the concave portion G2 of the cartridge 200.

In this configuration of the present disclosure, due to the insert-coupling configuration of the convex portion of the cooling plate 300 and the concave portion of the cartridge 200, a coupling force between the cooling plate 300 and the cartridge 200 may be further improved.

In addition, this coupling configuration of the convex portion and the concave portion may guide an assembling location when the cooling plate 300 and the cartridge 200 are assembled, thereby ensuring improved assembling of the battery module.

In addition, in this configuration, since a contact area between the cooling plate 300 and the cartridge 200 may increase due to the convex portion and the concave portion, it is possible to further enhance heat transfer rate and heat transfer capacity from the cartridge 200 to the cooling plate 300. Therefore, the cooling performance of the overall battery module may be further improved.

In particular, cartridges 200 adjacent to each other may have a single concave portion formed thereby. For example, referring the configuration depicted in FIG. 4, a cartridge C2 may have a lower end whose right side is concave in left and upper directions to configure a left part of the concave portion, and a cartridge C3 may have a lower end whose left side is concave in right and upper directions to configure a right side of the concave portion. Therefore, the cartridge C2 and the cartridge C3 may be disposed adjacent to each other to form a single concave portion G2, and a single convex portion P3 may be inserted into the concave portion.

In this configuration of the present disclosure, a concave portion may be formed at the cartridges 200 just by stacking the cartridges 200. In addition, since a concave portion is not formed at a single cartridge 200 but is formed by two cartridges 200 adjacent to each other, it is possible to prevent the cartridge 200 from having an increased size due to the concave portion, which also prevents the battery module from having an increased size.

Further, the pouch-type secondary battery 100 may have a sealing portion at a rim portion around a space where the electrode assembly is accommodated, so that two pouches are fused to each other. Therefore, as shown in FIG. 4, the pouch-type secondary battery 100 may have a lower end with an approximately inverted triangular shape due to the sealing portion. At this time, if concave portions are formed at the right and left portions of the cartridge 200 as described above, a distance between the secondary battery 100 and the cooling plate 300 decreases, and thus heat transfer efficiency from the secondary battery 100 to the cooling plate 300 increases, thereby enhancing cooling performance.

More preferably, the cooling plate 300 may be configured so that its convex portion has a lower concave portion. In other words, as indicated by G3 in FIG. 4, the lower portion of the convex portion of the cooling plate 300 may be formed concavely so that the cooling plate 300 has a concave portion at the lower side.

In this embodiment of the present disclosure, even though the convex portion is formed, it is possible to prevent the entire weight of the cooling plate 300 from increasing, thereby contributing to a light weight of the battery module. In addition, in this embodiment of the present disclosure, since an area of the lower portion of the cooling plate 300 increases due to the concave portion G3, heat emission performance through the cooling plate 300 may be enhanced.

Moreover, in this embodiment of the present disclosure, the concave portion at the lower portion of the cooling plate 300 may give a space in which other components of the battery module such as a wire are accommodated. For example, the battery module may include a wire for transmitting information, obtained by sensing a voltage of each secondary battery 100, to a control unit such as a battery management system (BMS). At this time, the wire may be accommodated in the concave portion G3 at the lower portion of the cooling plate 300 so that the wire may be protected and arranged, and also it is possible to prevent the battery module from having an increased volume caused by separately providing a wire accommodation space.

In addition, as shown in various figures, a plurality of convex portions may be provided on a single cooling plate 300. In addition, a plurality of concave portions G2 may also be provided at a cartridge assembly including a plurality of cartridges 200, corresponding to the number of the convex portions.

In this configuration of the present disclosure, by means of the plurality of convex portions P3 and concave portions G2, a coupling force of the battery module may be further enhanced, and a contact area may be further increased. In addition, more spaces capable of accommodating various components such as a plurality of wires may be provided.

In addition, as shown in FIGS. 1 and 2, the convex portion P3 may be elongated in a front and rear direction on the upper surface of the cooling plate 300. In other words, the convex portion may be formed to extend from a front end of the cooling plate 300 to a rear end thereof. In this embodiment of the present disclosure, by increasing a surface area of the cooling plate 300, heat emission performance through the cooling plate 300 may be further improved. In addition, in an embodiment of the present disclosure, a wire may be accommodated long in the concave portion G3 of the cooling plate 300 at the lower portion thereof from a front end to a rear end of the cooling plate 300.

More preferably, at least a part of the convex portion P3 of the cooling plate 300 may have an inclined surface with a width gradually decreasing along an upper direction. For example, the upper part of the convex portion P3 may be formed to have a triangular shape whose width in a right and left direction gradually decreases along the upper direction, as shown in FIG. 4. In addition, a lower part of the convex portion may have a uniform width in a right and left direction. In particular, the convex portion may be configured to have no flat portion in a horizontal direction.

In this embodiment of the present disclosure, the cartridge 200 and the cooling plate 300 may be coupled to each other more closely. In other words, in this embodiment, when the cartridge 200 is placed on the cooling plate 300, the cartridge 200 may move downwards along the inclined surface of the convex portion formed at the cooling plate 300, and by doing so, the cartridge 200 may move closest to the cooling plate 300. Therefore, the coupling force between the cartridge 200 and the cooling plate 300 may be further improved, and by doing so, the cooling performance may be further enhanced.

Here, the inclined surface S3 formed at an outer side of the convex portion may have a flat form. In other words, the inclined surface of the convex portion may have a planar shape instead of a curved shape, so that the cartridge 200 may move downwards as much as possible along the inclined surface of the convex portion. Therefore, in this configuration of the present disclosure, the cartridge 200 may be configured to move as close to the cooling plate 300 as possible.

Also preferably, the battery module according to the present disclosure may further include a cooling fin 400 as shown in various figures.

The cooling fin 400 may be made of a thermally-conductive material such as metal, for example aluminum or copper. In addition, the cooling fin 400 may have an approximately plate shape and be provided at the battery module in a state of standing in a vertical direction, and the cooling fin 400 may be disposed in parallel to the secondary battery 100 and the cartridge 200.

Here, the cooling fin 400 may be disposed so that its broad surface faces a surface of the secondary battery 100. In particular, the cooling fin 400 may be disposed to at least partially contact the surface of the secondary battery 100.

In addition, the cooling fin 400 may be configured so that its lower end contacts the cooling plate 300. Therefore, if heat is transferred from the secondary battery 100 to the cooling fin 400, the transferred heat may be directly conducted to the cooling plate 300 through the lower end of the cooling fin 400.

The cooling fin 400 may be disposed at an outermost side of the secondary battery 100 and/or at a location between the secondary batteries 100.

For example, as shown in FIG. 3, the cooling fins 400 may be located at a leftmost side and a rightmost side of the battery module. In other words, when a plurality of secondary batteries 100 are arranged at the battery module in a right and left direction, the cooling fins 400 may be provided to respectively make a surface contact with a left side of a secondary battery 100 located at a leftmost side and a right side of a secondary battery 100 located at a rightmost side.

In addition, as shown in FIG. 3, the cooling fin 400 may be disposed between two secondary batteries 100 in the battery module. In particular, a plurality of cooling fins 400 may be provided so that all secondary batteries 100 may make a surface contact with the cooling fins 400 directly. For example, if two cartridges 200 are coupled to each other and two secondary batteries 100 are accommodated in a space formed by the coupled cartridges 200, a cooling fin 400 may be located at an outer side of each cartridge 200, so that all secondary batteries 100 contact different cooling fins 400 from each other. In this configuration, a most surface of a central portion of each cooling fin 400 may make a surface contact with a left or right surface of the secondary battery 100, and a lower end of the cooling fin 400 may contact the cooling plate 300.

Also preferably, the cooling fin 400 may be configured so that both surfaces of its lower end make a surface contact with the cartridge 200 and the lower cooling plate 300. This will be described in more detail with reference to FIG. 5.

Figure 5:
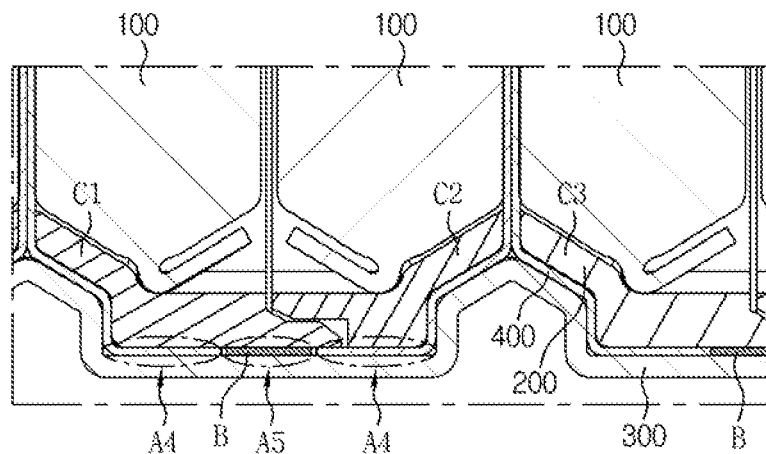
FIG. 5 is a diagram schematically showing that a cartridge and a cooling plate of FIG. 4 are coupled to each other.

FIG. 5 is a diagram schematically showing that the cartridge 200 and the cooling plate 300 of FIG. 4 are coupled to each other. In other words, FIG. 5 may be regarded as an enlarged view for the portion A3 of FIG. 3.

Referring to FIG. 5, the cooling fin 400 may be configured so that its lower end is bent in a horizontal direction. In addition, the lower end of the cooling fin 400 formed in a horizontal direction as described above may be interposed between the cartridge 200 and the cooling plate 300. In other words, as indicated in a portion A4 of FIG. 5, an upper surface of the lower end of the cooling fin 400 may contact the lower portion of the cartridge 200, and a lower surface of the lower end thereof may contact the upper portion of the cooling plate 300.

In this configuration of the present disclosure, by increasing a contact area between the cooling fin 400 and the cooling plate 300, the capacity or transfer rate of heat transferred from the cooling fin 400 to the cooling plate 300 may be increased. In addition, in this configuration, the cooling fin 400 may become a medium for heat exchange between the cartridge 200 and the cooling plate 300. In other words, the heat of the cartridge 200 may be transferred to the lower end of the cooling fin 400, which contacts the lower portion of the cartridge 200, and the transferred heat may also be transferred to the cooling plate 300 which contacts the lower end of the cooling fin 400.

Therefore, in this case, since heat is transferred through the cooling fin 400, instead of an air layer, between the cartridge 200 and the cooling plate 300, the heat transfer efficiency may be further improved. In addition, by decreasing a distance between the cartridge 200 and the cooling plate 300, cooling performance may be improved, and a volume of the battery module may be reduced.

Also preferably, the adhesive may be interposed between lower ends of two cooling fins 400 adjacent to each other, between the lower portion of the cartridge 200 and the upper portion of the cooling plate 300.

For example, in the configuration depicted in FIG. 5, two cartridges 200, namely C1 and C2, may be adjacently coupled to each other, and two secondary batteries 100 may be accommodated therein. At this time, at the lower portion of the cartridge C1, the cooling fin 400 may be located from a left end to a predetermined point in a right direction, and at the lower portion of the cartridge C2, the cooling fin 400 may be located from a right end to a predetermined point in a left direction. In this case, a space as indicated by A5 in FIG. 5 may be formed between the lower end of the cooling fin 400 located below the cartridge C1 and the lower end of the cooling fin 400 located below the cartridge C2, and an adhesive B may be filled in this space. In other words, the adhesive B may be filled at least in a space defined by a lower surface of the cartridge, an upper surface of the cooling plate 300, a left surface of the lower end of one cooling fin 400 and a right surface of the lower end of another cooling fin 400.

In this configuration of the present disclosure, as the cooling fin 400 is located in a space between the lower portion of the cartridge 200 and the upper portion of the cooling plate 300, a contact area between the cooling fin 400 and the cartridge 200 and a contact area between the cooling fin 400 and the cooling plate 300 are increased, thereby improving cooling performance through the cooling fin 400. Further, a space may be formed between the lower portion of the cartridge 200 and the upper portion of the cooling plate 300 since the cooling fin 400 is interposed therein, but this space is filled with an adhesive, so that an air layer is not located in the corresponding space, thereby preventing heat resistance from increasing due to the air layer.

Meanwhile, the adhesive may also be interposed between the cooling fin 400 and the cartridge 200 and/or between the cooling fin 400 and the cooling plate 300. In other words, even though FIG. 5 illustrates that the adhesive is located only in a space between the cartridge 200 and the cooling plate 300, the adhesive may also be located in a space between the cooling fin 400 and the cartridge 200 and/or between the cooling fin 400 and the cooling plate 300.

In this configuration of the present disclosure, the adhesive may be applied to the upper surface of the cooling plate 300 more easily, and a fixing force may be ensured between the cooling fin 400 and the cartridge 200 and/or between the cooling fin 400 and the cooling plate 300. In addition, it is possible to prevent an air layer from being formed between the cooling fin 400 and the cartridge 200 and/or between the cooling fin 400 and the cooling plate 300. In particular, depending on surface roughness of the cooling fin 400, the cartridge 200 and/or the cooling plate 300, an air layer may be formed between the cooling fin 400 and the cartridge 200 or between the cooling fin 400 and the cooling plate 300, which may deteriorate heat transfer efficiency. However, in this embodiment, even though the cooling fin 400, the cartridge 200 and/or the cooling plate 300 have somewhat rough surfaces, an air layer formed between them may be reduced by means of the adhesive, thereby ensuring heat transfer efficiency over a certain level.

Also preferably, at least a part of the lower end of the cooling fin 400 may be formed to be inclined in one direction.

For example, as indicated by S4 in FIG. 4, the cooling fin 400 may have an inclined surface at least partially. In particular, the cooling fin 400 may be configured to closely adhere to the outer surface of the cartridge 200. Therefore, if the cartridge 200 has an inclined surface formed at a lower end thereof, the cooling fin 400 may also have an inclined surface at a lower end thereof.

Further, the concave portion G2 may be formed at the cartridge 200 so that the convex portion P3 of the cooling plate 300 may be inserted therein, and the cooling fin 400 may be bent along the surface of the concave portion of the cartridge 200. In particular, at least a part of the concave portion may have an inclined surface which is inclined in a right or left direction on the ground by a predetermined angle. At this time, the inclined surface may have an approximately planar shape with a constant angle.

In this configuration of the present disclosure, since the inclined surface of the cooling fin 400 may be placed on the inclined surface of the convex portion and slide downwards along the inclined surface of the convex portion, the cooling fin 400 and the cooling plate 300 may be more closely adhered in a downward direction. Therefore, in this case, cooling performance by means of the contact between the cooling fin 400 and the cooling plate 300 may be further improved. In particular, for this, the cooling fin 400 may be configured to be perpendicular to the ground or to be inclined by a predetermined angle (greater than 0°) from the ground. In other words, the cooling fin 400 may be configured to have no portion parallel to the ground, except for its lowermost end portion.

Meanwhile, the cooling plate 300 may be configured so that its left and right ends are bent in an upper direction. For example, as indicated by A6 in FIGS. 2 and 3, the left and right ends of the cooling plate 300 may be bent in an upper direction, for example in a direction perpendicular to the ground as much as about 90°.

In this case, the bent portions of the cooling plate 300 at its left and right sides may surround an outer surface of the cartridge 200 or the cooling fin 400 to some extent. In particular, the bent portion of the cooling plate 300 may be configured to contact an outer surface of an outermost cartridge 200 or an outermost cooling fin 400. Therefore, in this configuration of the present disclosure, a coupling force between the cartridge 200 and the cooling plate 300 or a coupling force between the cooling fin 400 and the cooling plate 300 may be enhanced. In addition, by increasing a contact area between the cooling fin 400, or the cartridge 200, located at an outermost side and the cooling plate 300, the heat transfer performance between the cooling fin 400, or the cartridge 200, and the cooling plate 300 may be improved.

Preferably, in the battery module according to the present disclosure, the secondary battery 100 may be placed on a lower unit frame of the cartridge 200.

For example, a lower unit frame of the cartridge 200 may be located below the secondary battery 100, and at this time, the lower portion of the secondary battery 100 may be placed in contact with the upper portion of the lower unit frame, as shown in FIGS. 4 and 5.

In this configuration of the present disclosure, since the secondary battery 100 is fixed in direct contact with the cartridge 200, the space between the secondary battery 100 and the cartridge 200 is reduced, and thus the battery module may be configured with a more compact design.

In addition, in this configuration of the present disclosure, the heat exchange performance between the secondary battery 100 and the cartridge 200 may be further improved. In other words, in the above configuration, since the lower portion of the secondary battery 100 is in direct contact with the cartridge 200, the heat of the secondary battery 100 may be directly transferred to the cartridge 200 without passing through an air layer.

Further, the secondary battery 100 may contact the cartridge 200 not only at its lower portion but also at its upper portion. In other words, the upper portion of the secondary battery 100 may contact a lower portion of the upper unit frame. In this configuration of the present disclosure, since the secondary battery 100 is provided to contact both the upper unit frame and the lower unit frame between them, it is possible to prevent the secondary battery 100 from moving in a vertical direction.

Also preferably, at least a part of the cartridge 200 may be made of a thermally-conductive material. In particular, when the lower portion of the secondary battery 100 is placed on the upper portion of the lower unit frame, the lower unit frame of the cartridge 200 may be made of a thermally-conductive material.

Here, in order to implement the thermal-conductive characteristic, the cartridge 200 may be made of a material containing thermally-conductive polymer, or a thermally-conductive material containing a thermally-conductive filler and polymer. In other words, the cartridge 200 may be made using a polymer as a main material, instead of general metal or metal alloy. The polymer-based thermally-conductive material is lighter than metal, which allows the battery module to easily have a lighter design, ensures easy molding, low thermal expansion coefficient and low electric conduction, which leads to better electric insulation. In this embodiment, the material of the cartridge 200 may adopt various kinds of polymer-based thermally-conductive materials known to the public at the time of filing of the present disclosure.

For example, the cartridge 200 may be made of a composite material in which a general polymer is mixed with thermally-conductive fillers. Here, the filler may include silicon compound, aluminum compound, magnesium compound, boron compound or the like. For example, the filler included in the thermally-conductive material may employ silicon oxide, aluminum oxide, boron nitride, aluminum nitride, magnesium oxide, anhydrous magnesium carbonate, magnesium hydroxide or the like. However, the present disclosure is not limited thereto, and various fillers other than the above may also be used as a material of the cartridge 200.

The polymer used in the cartridge 200 may include various materials such as polypropylene, acrylonitrile butadiene styrene, polycarbonate, nylon, liquid crystal polymer, polyphenylene sulfide, polyetherether ketone or the like. In addition, various polymer materials other than the above may also be used as a material of the cartridge 200 of the present disclosure.

In particular, the thermally-conductive material of the cartridge 200 may have heat conductivity of 1 W/mK or above. For example, this thermally-conductive material may be polymer plastic or rubber with 2 W/mK to 20 W/mK. Further, the thermally-conductive material may be composed of a material with 5 W/mK or above.

In an existing technique, plastic used as a material of a cartridge or the like generally has thermal conductivity of just 0.1 W/mK to 0.4 W/mK, which is substantially negligible. However, in case of the cartridge according to the present disclosure, since a polymer material having higher thermal conductivity is used, the cartridge may allow heat transfer and emission. Therefore, in this embodiment of the present disclosure, even though a cooling member such as the metallic cooling plate 300 is not separately provided in the cartridge 200, heat of the secondary battery 100 may be effectively discharged to the outside through the cartridge 200.

Further, in an aspect of the present disclosure, since the lower portion of the secondary battery 100 directly contacts the cartridge 200, the heat of the secondary battery 100 may be transferred directly to the cartridge 200 at this portion without passing through the air. In addition, since the portion of the cartridge 200 contacting the secondary battery 100 is made of thermally-conductive material, the heat transferred to the cartridge 200 may be rapidly discharged to the cooling plate 300 through the cartridge 200.

Also preferably, at least a part of the secondary battery 100 may be adhered and fixed to the cartridge 200 by means of an adhesive. This will be described in more detail with reference to FIG. 6.

Figure 6:
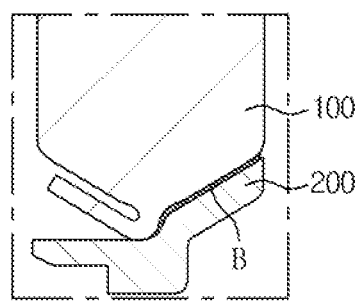
FIG. 6 is a diagram schematically showing that a secondary battery and a cartridge according to an embodiment of the present disclosure are adhered to each other.

FIG. 6 is a diagram schematically showing that a secondary battery 100 and a cartridge 200 according to an embodiment of the present disclosure are adhered to each other. For example, FIG. 6 may be regarded as an enlarged view which may be applied to a portion A7 of FIG. 3. In FIG. 6, for convenience, only the secondary battery 100 and the cartridge 200 are depicted.

Referring to FIG. 6, a part of the lower surface of the secondary battery 100 may be adhered to the cartridge 200. In other words, in FIG. 6, an adhesive B may be interposed between a right inclined surface of the lower portion of the secondary battery 100 and a right upper inclined surface of the lower unit frame of the cartridge 200, so that the secondary battery 100 and the cartridge 200 may be adhered and fixed to each other.

In this configuration of the present disclosure, the coupling force between the secondary battery 100 and the cartridge 200 may be reinforced by means of the adhesive B. In addition, since an air layer between the secondary battery 100 and the cartridge 200 may be removed or eliminated by filling the adhesive B, the heat transfer performance between the secondary battery 100 and the cartridge 200 may be improved, thereby enhancing the overall cooling performance.

Figure 7:
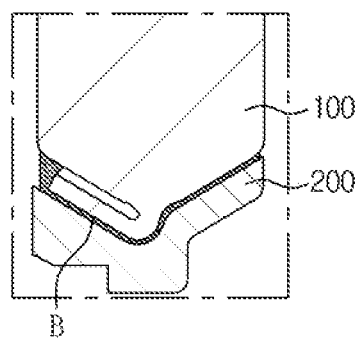
FIG. 7 is a diagram schematically showing that a secondary battery and a cartridge according to another embodiment of the present disclosure are adhered to each other.

FIG. 7 is a diagram schematically showing that a secondary battery 100 and a cartridge 200 according to another embodiment of the present disclosure are adhered to each other.

Referring to FIG. 7, the secondary battery 100 may be adhered and fixed to the cartridge 200 by providing an adhesive B to the entire lower surface thereof. In this case, a placing surface of the cartridge 200, namely an upper surface of the lower unit frame, may be formed to have a shape corresponding to the secondary battery 100. In particular, the pouch-type secondary battery 100 may have a lower portion with an approximately inversed triangular shape so that a sealing portion is formed thereto. Therefore, as shown in FIG. 7, the lower unit frame may be configured to have an upper surface which becomes higher from its center portion along a right and left direction, to correspond to the shape of the lower portion of the secondary battery 100. In this configuration of the present disclosure, the adhesive force between the secondary battery 100 and the cartridge 200 may be easily enhanced, while using the adhesive B by a smaller amount.

The adhesive interposed between the secondary battery 100 and the cartridge 200 may be a thermally-conductive adhesive. Since the thermally-conductive adhesive has higher thermal conductivity in comparison to general adhesives, the thermally-conductive adhesive may further enhance heat transfer capacity and heat transfer rate between the secondary battery 100 and the cartridge 200. Therefore, in this embodiment of the present disclosure, the heat transfer efficiency from the secondary battery 100 to the cartridge 200 may be enhanced, which may improve cooling performance of the battery module.

Meanwhile, in the above configuration, the sealing portion of the pouch-type secondary battery 100 may be folded in a right or left direction. For example, as shown in FIG. 7, the sealing portion of the secondary battery 100 may be folded at least once in a left direction toward the electrode assembly accommodation space. In addition, the sealing portion folded as described above may be interposed between the inclined surface of the secondary battery 100 at an outer side of the electrode assembly accommodation space and the inner surface of the cartridge 200, and adhered and fixed thereto.

In this configuration of the present disclosure, by reducing a space occupied by the sealing portion, the battery module may have a small design more easily. In addition, by reducing a distance between the secondary battery 100 and the cartridge 200, the heat transfer efficiency from the secondary battery 100 to the cartridge 200 may be enhanced. In particular, since the secondary battery 100 contacts an inner side of the folded sealing portion and the cartridge 200 contacts an outer side of the folded sealing portion, the heat in the secondary battery 100 may also be transferred to the cartridge 200 through the folded region of the sealing portion.

A battery pack according to the present disclosure may include at least one battery module as described above. Moreover, the battery pack according to the present disclosure may further include a pack case for receiving the battery module, various devices for controlling charging/discharging of the battery module, for example a battery management system (BMS), a current sensor, a fuse or the like, in addition to the battery module.

The battery module according to the present disclosure may be applied to a vehicle such as an electric vehicle or a hybrid electric vehicle. In other words, the vehicle according to the present disclosure may include the battery module as described above. In particular, in case of a vehicle such as an electric vehicle which obtains a driving force from a battery, the cooling performance of the battery module is very important. Therefore, if the battery module according to the present disclosure is applied to such a vehicle, it is possible to provide a stable and safe battery module with effective cooling performance.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:
1. A battery module, comprising:
 a plurality of pouch-type secondary batteries standing in a vertical direction and arranged in a right and left direction;

a plurality of cartridges configured to accommodate the pouch-type secondary batteries in an inner space thereof and stacked in a right and left direction;

a cooling plate made of a thermally-conductive material and disposed at a lower portion of the cartridges so that the cartridges are placed thereon, the cooling plate having an upper surface which is at least partially adhered and fixed to the cartridges by means of an adhesive; and a plurality of cooling fins, each cooling fin being disposed to contact a surface of a respective secondary battery, and each cooling fin having a lower end contacting the cooling plate at a respective contacting surface, wherein the plurality of cooling fins includes two adjacent cooling fins that abut against one another with the lower ends of the two adjacent cooling fins forming a shape that corresponds to a shape of the cooling plate at the entirety of the respective contacting surface and that corresponds to a shape of a lower portion of the cartridges, each cartridge being located between a respective battery and an entirety of the lower end of the respective cooling fin, wherein the cooling plate has a convex portion formed at an upper surface thereof in an upper direction, and wherein each cartridge has a concave portion formed at the lower portion thereof that has a shape corresponding to the convex portion of the cooling plate.

2. The battery module according to claim 1,
wherein a lower surface of each of the two adjacent cooling fins has a concave portion corresponding to and contacting the convex portion of the cooling plate at the respective contacting surface.

3. The battery module according to claim 1,
wherein the convex portion of the cooling plate has an inclined surface at least partially having a width gradually decreasing along an upper direction.

4. The battery module according to claim 1, wherein each cooling fin made of a plate-shaped thermally-conductive material.

5. The battery module according to claim 4,
wherein each cooling fin is disposed to at least one of an outermost side of the respective secondary battery and a location between adjacent secondary batteries.

6. The battery module according to claim 4,
wherein the lower end of each cooling fin makes surface contact with the respective cartridge and the cooling plate.

7. The battery module according to claim 4,
wherein the adhesive is interposed between lower ends of the two adjacent cooling fins, between the lower portion of the respective cartridge and an upper portion of the cooling plate.

8. The battery module according to claim 4,
wherein the lower end of each cooling fin is at least partially inclined in one direction.

9. The battery module according to claim 1,
wherein a left end and a right end of the cooling plate are bent in an upper direction.

10. The battery module according to claim 1,
wherein a lower portion of a respective one of the secondary batteries is placed on an upper portion of a lower unit frame of the respective cartridge.

11. The battery module according to claim 10,
wherein at least the lower unit frame of each of the cartridges includes a thermally-conductive polymer or is made of a thermally-conductive material containing a thermally-conductive filler and polymer.

12. The battery module according to claim 10,
wherein each of the pouch-type secondary batteries is at least partially adhered and fixed to the cartridge by means of an adhesive.

13. The battery module according to claim 1,
wherein the adhesive is a thermally-conductive adhesive.

14. A battery pack, comprising the battery module defined in claim 1.

15. A vehicle, comprising the battery module defined in claim 1.

* * * * *